United States Patent [19]

MacDonald

[11] 4,238,912
[45] Dec. 16, 1980

[54] ROOFING SYSTEMS

[75] Inventor: Robert W. G. MacDonald, Templestowe, Australia

[73] Assignee: Solar Thermal Consultants Pty. Limited, Canberra, Australia

[21] Appl. No.: 890,905

[22] Filed: Mar. 27, 1978

[51] Int. Cl.$^3$ ............................................. E04H 14/00
[52] U.S. Cl. ................................ 52/173 R; 29/157 R; 52/469; 52/530; 52/531; 126/450
[58] Field of Search ............... 29/157 R, 157.3 R, 428, 29/526 R; 126/270, 271, 450; 52/27, 173 R, 469, 518, 530, 531, 535, 538

[56] References Cited
U.S. PATENT DOCUMENTS

| 3,961,619 | 6/1976 | Estes et al. | 126/270 X |
| 4,000,850 | 1/1977 | Diggs | 52/173 R |
| 4,073,283 | 2/1978 | Lof | 126/270 |
| 4,120,284 | 10/1978 | Catsworth | 126/270 |
| 4,123,883 | 11/1978 | Barber, Jr. | 126/270 X |

Primary Examiner—Charlie T. Moon
Attorney, Agent, or Firm—Cushman, Darby & Cushman

[57] ABSTRACT

The invention relates to a modular roofing system having a plurality of tray modules wherein each module is capable of accommodating one or more solar collectors. Each adjacent or adjacent groups of modules are connected to each other and there is provided support means for supporting the plurality of tray modules.

1 Claim, 5 Drawing Figures

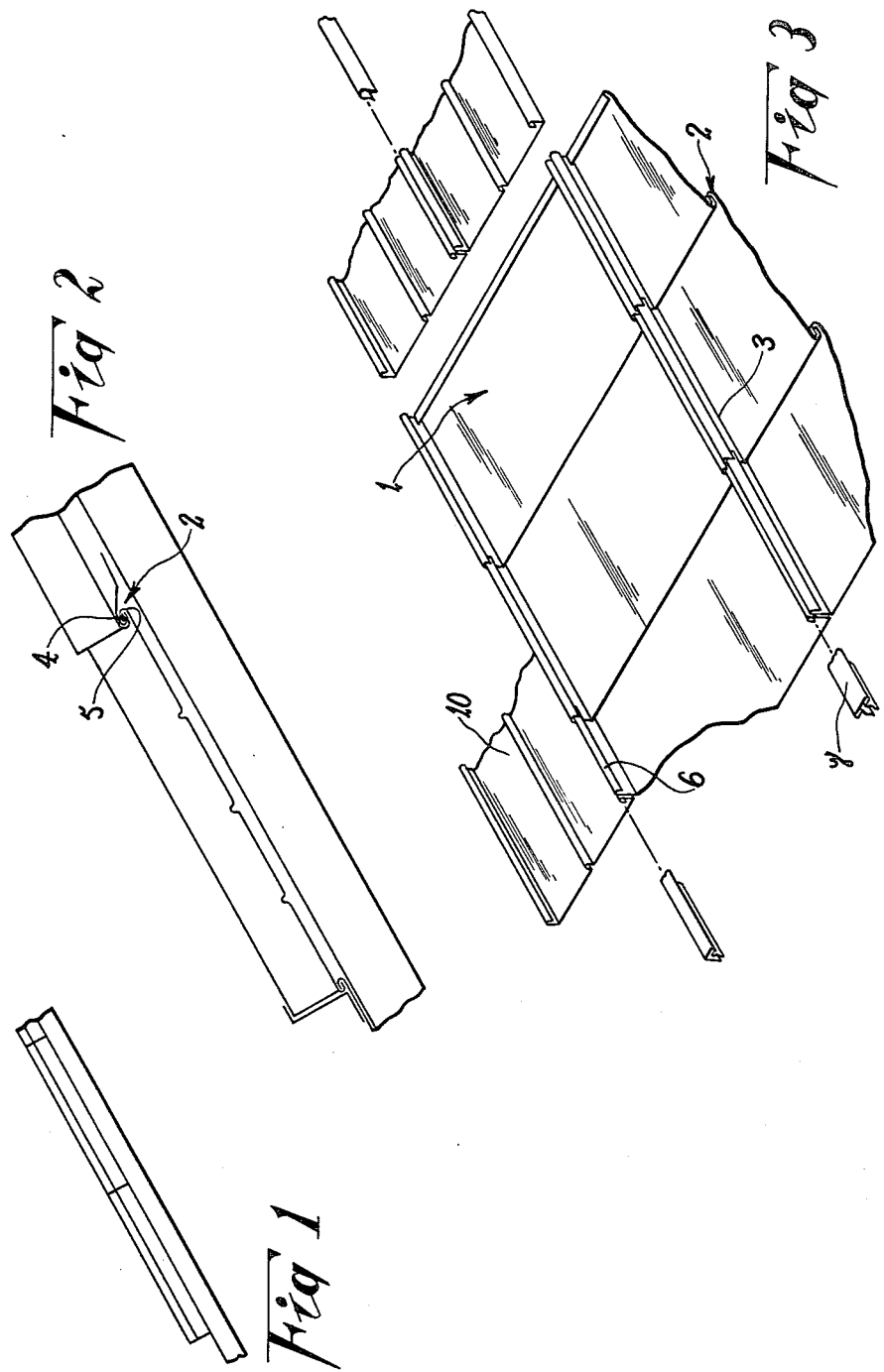

ROOFING SYSTEMS

This invention relates to a modular roofing system wherein each module of the roofing system is especially adapted to accommodate one or more solar collectors.

Hitherto when it was desired to mount solar collectors, especially of the panel type, onto existing roofing structures, one or more of the panel collectors were placed on top of the existing roofing structure and attached thereto in suitable manner. This method of mounting the collectors to the roof necessitated the adoption of externally exposed pipes connecting each of the individual collectors and also the use of externally exposed insulation material which had to be packed around each individual collector. This method of mounting conventional "off the shelf" collectors to existing roofing structures was expensive, difficult to carry out in many cases because of the characteristics of the existing roof structure, and wasteful in operation because of the inefficient utilization of solar energy.

When it was desired to construct new roofing structures especially adapted for accommodating solar collectors, it was usual to design a specific individual collector suitable for the roofing structure.

When one had to design a specific collector one had to consult experienced solar heating engineers to design the collector and this procedure was rather expensive. Thus the individual collector was complex in nature and expensive to install.

It is an object of the invention to provide a roofing system adapted to accommodate a plurality of solar collectors which is simple in nature and inexpensive to construct.

Although the primary purpose of the roofing system of the invention is for the accommodation of solar collectors, it will be appreciated that this is not the sole application thereof.

The invention in one aspect provides a modular roofing system including:

a plurality of tray modules wherein each module is capable of accommodating one or more solar collectors;

connection means interconnecting each adjacent tray module or adjacent groups of tray modules; and support means supporting said plurality of tray modules.

In another aspect the invention provides a method of assembling a roofing system having a plurality of tray modules with each module adapted to accommodate at least one solar collector, said method including the sequential steps of:

(a) forming a support means to support said plurality of tray modules;

(b) arranging each tray module on said support means in the desired relationship; and (c) interconnecting each adjacent tray module or adjacent groups of tray modules.

Reference is made to the attached drawings illustrating a preferred embodiment of the invention wherein:

FIG. 1 represents an end elevation of a sloping modular roofing system constructed in accordance with the invention;

FIG. 2 represents the modular roofing system of FIG. 1 in more detail showing the interconnection between adjacent tray modules;

FIG. 3 represents an exploded view of the module roofing system of FIG. 1;

Figure 4:
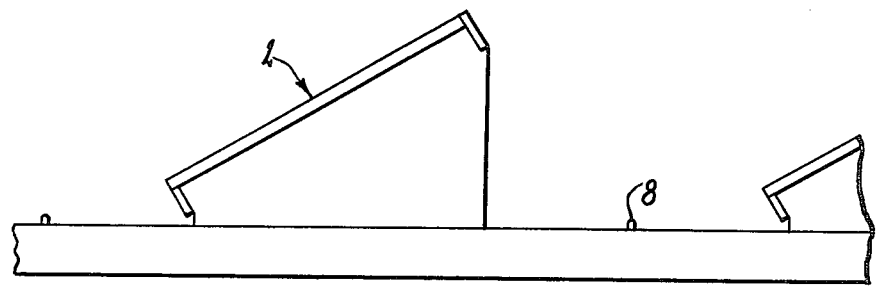
FIG. 4 represents an end elevation of a flat module roofing system constructed in accordance with the invention.

The roofing system of the invention includes a plurality of tray modules designated as 1 in the drawings. Each tray module has a base wall and usually at least one pair of oppositely located side walls. Each tray module may have another pair of oppositely located side walls if desired. The depth of each tray module is preferably rather shallow and is of suitable configuration (e.g. rectangular) to accommodate a solar collector panel. In the most preferred form the tray module is therefore rectangular having one pair of opposite edges designated as 2 in the drawings ("longitudinal") and another pair of opposite edges ("transverse"). The terms "longitudinal" and "transverse" generally designate the longer and shorter edges respectively but the configuration depends on the roofing system desired. It is preferred that each tray module has only one pair of vertically oriented (i.e. in relation to the base wall) transverse side walls designated as 3 in the drawings.

Each tray module may be connected to adjacent tray modules by tray module connection means. This connection may be accomplished in any appropriate manner such as by using clips, nails, screws or any other means as is known in the art. However for maintenance purposes it is preferred to provide tray module connection means which is readily detachable or which allows ready disconnection of adjacent tray modules.

In one form the detachable connection means each module may have a pair of locking flanges with each flange extending from a respective edge of one pair of opposed edges of the module. Preferably the detachable connection means includes an additional pair of locking flanges which extend from a respective edge of another pair of opposed edges of the module. Each locking flange of both pairs may engage with an adjacent flange of an adjoining module so as to provide a secure and readily disconnectable arrangement of modules.

In a more particular form of tray module connection means each tray module has a pair of continuous hooking flanges extending from each longitudinal side edge. Thus in this form of the invention are longitudinal side edge of one module may be interconnected to an adjoining longitudinal side edge of another module by one hooking flange being engageable in an adjacent hooking flange of complementary configuration.

In the most preferred form of tray module connection means, each tray module has one hooking flange which depends from one longitudinal side edge thereof designated as 4 in the drawings and another hooking flange designated as 5 in the drawings which extends upwardly from the other longitudinal side edge. Each hooking flange may have a complementary configuration and is suitably U-shaped with the two arms of the U being substantially parallel with each other.

Preferably the U-shaped flanges are formed by bending respective portions of the longitudinal side edges of the module back upon themselves with the free arm of the U extending substantially parallel to the base wall of the module in each case. With respect to one longitudinal side edge the free arm of the U may extend upwardly and then substantially parallel to the plane of the base wall and with respect to the other longitudinal side edge the free arm of the U may extend downwardly and then substantially parallel to the plane of the base wall.

It will therefore be appreciated that one depending hooking flange of one module may be readily engageable in an upstanding hooking flange of an adjoining module.

In another form of tray module connection means each transverse side wall of each module may have a U-shaped flange designated as 6 in the drawings extending from the top edge thereof with the two arms of the U being substantially parallel with each other. It is preferred that the free arm of the U extend downwardly within the confines of the module. Thus in this embodiment one transverse side wall of one module may be placed into alignment with a corresponding side wall of another module and the free arms of both U-shaped flanges extend downwardly substantially parallel to each other within the confines of each module. One can therefore utilize an appropriate clip such as a T clip designated as 7 in the drawings wherein the stem of the T has an open ended channel suitable for receiving both transverse side wall top dge portions of each adjacent module and their respective U-shaped flanges. The free arms of each adjoining flange may be biased outwardly and will then be restrained by the opposing side walls of the open ended channel within the T clip. This will therefore provide a secure interconnection between the respective adjoining transverse side walls of adjacent modules.

It is most preferred however that both forms of tray module connection means as described above be utilized in a roofing system constructed in accordance with the invention with the adjoining longitudinal side edges of associated modules connected to each other by their respective hooking flanges and adjacent transverse side walls being connected to each other by their respective U-shaped flanges engaging each other in clipped relationship.

The roofing system of the invention includes tray module support means which may be of any appropriate type to support a plurality of tray modules. One suitable support means comprises a plurality of spaced parallel cross members such as conventional roofing means designated as 8 in the drawings. If a sloping roof is desired the support means may consist almost entirely of said beams. On the other hand if a flat roof is desired the support means may comprise some additional integers as hereinafter described.

In the sloping roof embodiment the tray modules may be connected to the beams in any appropriate manner. The spaced parallel support beams may extend at any appropriate angle to the horizontal such as 45°. Preferably the longitudinal axes of the modules extend transversely to the beams.

If a flat roof is desired the tray module support means may include in addition to the spaced parallel beams referred to above one or more upright members such as upstanding posts but more preferably elongated upstanding panels designated as 9 in the drawings which may be connected to their associated beams in an appropriate manner. The free top edge of each panel may support one side (preferably a longitudinal side) of one or more modules with the other opposed side being supported by the spaced parallel beams. In this embodiment the parallel beams may comprise the horizontal portion of the flat roof. Thus in this form of the invention a plurality of modules may be arranged so that they slope upwardly with regard to the horizontal. Each module may be attached to the free top edge of the upstanding panel in any appropriate manner (e.g. such as by complementary hooking flanges in the same fashion as described above for interconnecting adjoining longitudinal side edges of adjacent modules).

The flat roof may also comprise a plurality of modules attached to the horizontal portion of the roof constituted by said parallel beams whereby the beams preferably extend transversely to the longitudinal axis of each module.

In regard to the upstanding panels these may be solid but are more preferably open spaced thus forming a rectangular framework. They may suitably incorporate panes of glass, or alternatively act as ventilators with or without ventilator strips.

The tray module support means in the flat roof embodiment may also further include peripheral supports for the ends of the rows of sloping modules which may conveniently comprise a triangular framework. In this embodiment the framework preferably corresponds to a right angled triangle with the hypotenuse thereof supporting the respective modules located at each end of a particular row. The frameworks may be connected to their associated modules and upstanding panels in any suitable manner. The frameworks may also be attached to the adjacent beams in an appropriate fashion. The frameworks may also have a cover plate if desired.

Thus in relation to the flat roof embodiment it will be appreciated that there may be provided a multiplicity of alternating rows of tray modules, one row comprising a plurality of modules sloping to the horizontal and supported by said one or more upstanding members as well as the parallel beams, and an adjacent row wherein the modules are horizontally oriented being attached to the parallel beams.

It will be appreciated that the roofing system of the invention may be applied in relation to construction or replacement of portion of an existing roof system as well as construction or replacement of an entire roof system.

It will also be appreciated that the roofing system of the invention may include sections of conventional roofing structure such as decking shown as 10 in FIG. 3. Thus in the flat roof embodiment described above alternating rows of sloping and horizontally oriented modules may be separated by intermediate decking sections.

The invention not only includes within its scope a modular roofing system adapted to receive a plurality of solar collectors, but also to the resulting assembly of modules and collectors incorporated therein.

Figure 5:
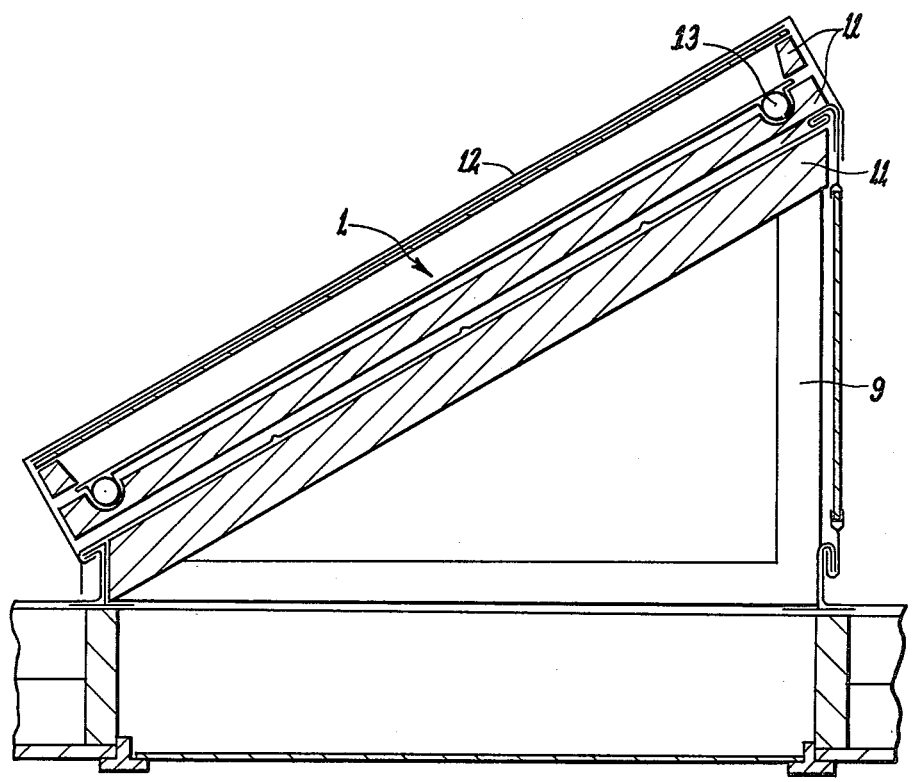
FIG. 5 represents a sectional view of the modular roofing system of FIG. 4.

In this aspect of the invention preferably each module is adapted to receive a single collector although this is not essential. A typical module-collector assembly constructed in accordance with the invention includes a module as described above having accommodated therein a solar collector (preferably of the panel type) having an enveloping shell or layer of insulation material designated as 11 in FIG. 5. The module may also have appropriate holes bored therein (preferably in the side walls) to function as an inlet and outlet for the fluid to be heated by the sun which circulates within the collector in appropriate conduits designated as 13 in the drawings. The modules may also have an outer covering such as glass designated as 12 in the drawings.

Suitable collectors which may be included in the roofing system of the invention may be of the solar water heating type, solar air type, solar heat pump panel type or any other appropriate collector such as known in the art.

It will be appreciated that the roofing system of the invention makes it possible to accommodate the solar collector (preferably of the panel type) in such a manner that each collector forms part of a closed system or integrated unit whereby exposed pipes or exposed layers of insulation material are minimized or eliminated.

The invention also includes within its scope a method of assembling a modular roofing system including a plurality of modules with each module adapted to receive a solar collector in accordance with the procedure hereinbefore described.

It will be appreciated that the modular roofing system of the invention can be applied to any common roofing material used in the building industry. However it is preferred that each module is manufactured from steel. However aluminum, galvanised iron and fibro-cement can also be utilized.

Finally, it is to be understood that various alterations, modifications and/or additions may be introduced into the constructions and arrangements of parts previously described without departing from the spirit or ambit of the invention.

I claim:

1. A modular roofing assembly comprising: a plurality of tray modules each of which is capable of accommodating at least one solar collector, each tray module being formed of a generally planar rectangular bottom wall, an upstanding transverse continuous side wall extending along each of the two opposite transverse side edges of the bottom wall, and a continuous substantially U-shaped hooking flange extending along each of the two opposite longitudinal side edges of the bottom wall, one of the hooking flanges having a lower free arm disposed below and parallel to its respective side edge and the other hooking flange having an upper free arm disposed above and parallel to its respective side edge, the upper free arm of one module being hooked to the lower free arm of an adjoining module; the upper edge of each of said upstanding transverse walls terminating in a substantially U-shaped flange having a free arm extending downwardly within the confines of the respective module; and a clip connecting the side wall of one module to the side wall of an adjoining module, the clip having an open-ended channel receiving the top edge portions of the adjoining side walls and their respective U-shaped flanges, the free arnm of each adjoining flange being biased outwardly relative to its respective module and being restrained by the opposing side walls of the open-ended channel within the clip.

* * * * *